United States Patent
Pruett et al.

(10) Patent No.: US 9,160,022 B2
(45) Date of Patent: Oct. 13, 2015

(54) SYSTEMS AND METHODS PROVIDING A WEARABLE POWER GENERATOR

(75) Inventors: James A. Pruett, Allen, TX (US); Howard C. Choe, Southlake, TX (US); Byron Elliott Short, Jr., Fairview, TX (US); Larry C. Bowling, Mesquite, TX (US)

(73) Assignee: Raytheon Company, Waltham, MA (US)

( * ) Notice: Subject to any disclaimer, the term of this patent is extended or adjusted under 35 U.S.C. 154(b) by 619 days.

(21) Appl. No.: 13/425,772

(22) Filed: Mar. 21, 2012

(65) Prior Publication Data

US 2012/0242274 A1 Sep. 27, 2012

Related U.S. Application Data

(60) Provisional application No. 61/466,293, filed on Mar. 22, 2011.

(51) Int. Cl.
| | |
|---|---|
| *H02J 7/00* | (2006.01) |
| *H01M 8/12* | (2006.01) |
| *H01M 8/00* | (2006.01) |
| *H01M 8/04* | (2006.01) |
| *H01M 16/00* | (2006.01) |

(52) U.S. Cl.
CPC ............ *H01M 8/1233* (2013.01); *H01M 8/002* (2013.01); *H01M 8/04208* (2013.01); *H01M 8/1286* (2013.01); *H01M 16/006* (2013.01); *H01M 2250/30* (2013.01); *H01M 2250/402* (2013.01); *Y02B 90/12* (2013.01); *Y02B 90/18* (2013.01); *Y02E 60/521* (2013.01); *Y02E 60/525* (2013.01)

(58) Field of Classification Search
CPC ............ H02J 7/35; H02J 7/355; Y02E 60/12; H01M 10/465; H01M 16/006
USPC .......................................................... 320/101
See application file for complete search history.

(56) References Cited

U.S. PATENT DOCUMENTS

| | | | |
|---|---|---|---|
| 5,728,464 | A | 3/1998 | Checketts |
| 6,773,843 | B2 | 8/2004 | Kitagawa et al. |
| 6,924,054 | B2 | 8/2005 | Prasad et al. |
| 7,648,792 | B2 | 1/2010 | Kaschmitter et al. |
| 2004/0072046 | A1* | 4/2004 | Schmidt .......................... 429/34 |

(Continued)

FOREIGN PATENT DOCUMENTS

| | | |
|---|---|---|
| WO | WO 2004/051781 A2 | 8/2004 |
| WO | WO 2007/148117 A1 | 12/2007 |

OTHER PUBLICATIONS

International Preliminary Report on Patentability dated Oct. 3, 2013.

(Continued)

*Primary Examiner* — Arun Williams
(74) *Attorney, Agent, or Firm* — Daly, Crowley, Mofford & Durkee, LLP

(57) ABSTRACT

A wearable, hybrid power generation system includes a rechargeable battery, a solid fuel cell power generator coupled to the rechargeable battery, and a cartridge with fuel for the solid fuel cell power generator. The cartridge is removeably coupled to the solid fuel cell power generator. The rechargeable battery, the solid fuel cell power generator, and the cartridge may be housed in a form factor conforming to a shape and size of a standard battery.

21 Claims, 5 Drawing Sheets

(56) References Cited

U.S. PATENT DOCUMENTS

| | | |
|---|---|---|
| 2004/0086755 A1 | 5/2004 | Kalal |
| 2004/0174072 A1* | 9/2004 | Bourilkov et al. .............. 307/66 |
| 2005/0048330 A1* | 3/2005 | Ozeki et al. ..................... 429/15 |
| 2005/0058876 A1 | 3/2005 | Fujita et al. |
| 2005/0115637 A1 | 6/2005 | Adams et al. |
| 2005/0173022 A1* | 8/2005 | Adams ......................... 141/351 |
| 2006/0024544 A1* | 2/2006 | Nielsen et al. .................. 429/26 |
| 2006/0030652 A1 | 2/2006 | Adams et al. |
| 2006/0083959 A1 | 4/2006 | Eritate et al. |
| 2006/0134470 A1 | 6/2006 | Kaye et al. |
| 2007/0099056 A1 | 5/2007 | Kono et al. |
| 2008/0187798 A1 | 8/2008 | McLean et al. |
| 2008/0272128 A1 | 11/2008 | Norimatsu et al. |
| 2009/0284216 A1* | 11/2009 | Bessa et al. ................... 320/101 |

OTHER PUBLICATIONS

PCT Search Report of the ISA for PCT/US2012/029887 dated Aug. 2, 2012.

Written Opinion of the ISA for PCT/US2012/029887 dated Aug. 2, 2012.

Notification of Transmittal of the International Search Report and the Written Opnion of the International Searching Authority, or the Declaration dated Jun. 5, 2012 in connection with International Patent Application No. PCT/US2012/023699.

\* cited by examiner

SYSTEMS AND METHODS PROVIDING A WEARABLE POWER GENERATOR

CROSS REFERENCE TO RELATED APPLICATION

The present application claims the benefit of U.S. Provisional Patent Application No. 61/466,293 filed on Mar. 22, 2011, which is hereby incorporated by reference in its entirety.

FIELD

The subject matter disclosed herein relates generally to power generation and, more specifically, to devices, systems, and techniques for providing portable power generation.

BACKGROUND

The United States Army and other military services are moving towards a Situational Awareness (SA) system and other electronic devices to enhance soldiers' warfighting capability and survivability. These soldier electronic devices include the use of advanced user displays and geolocation devices to provide real-time troop location and communication to dismounted soldiers and their leaders. An example soldier system includes, among other things, tactical/armored vest with packets for storing electronic devices, a suite of SA electronics, computers, radios, displays, and other soldier wearable/portable tactical electronic devices.

The Army and other military services have been upgrading the current soldier system to include the use of more advanced electronics than have previously been deployed with soldiers. Wearable electronics typically need wearable power sources. Currently, the U.S. Army is working towards powering most of its wearable electronics with AA batteries and/or LI-145 batteries. LI-145 batteries are 15V lithium-ion rechargeable batteries that store about 145 Watt-hours (Wh) of energy and occupy a form factor of about 8.25 inches by about 3 inches with about a 1.7 inch thickness. During a 72-hour mission, a dismounted soldier may be expected to wear six LI-145 batteries at 2.2 pounds each in addition to AA batteries, electronics, and other equipment.

There is a need for alternative power sources that can be used by soldiers in the field and by others in mobile situations. There is also a need for portable power sources that are compact in size and lighter in weight than traditional batteries.

SUMMARY

Techniques, systems, and devices described herein relate to power generators having a size and weight that make them suitable for use as wearable power sources. The power generators may be used in military applications as well as a wide variety of other applications requiring a portable power source. In some embodiments, wearable power generators are provided that conform to the size and shape of a standard battery (e.g., an LI-145 battery, etc.). The wearable power generators may also be lighter in weight than batteries having similar energy output. In addition, the wearable power generators may use replaceable fuel cartridges that can be easily changed in the field. The fuel cartridges are hot swappable in some implementations, allowing the cartridges to be changed without interrupting energy production.

In accordance with the concepts, systems, circuits, and techniques described herein, a system comprises: a rechargeable battery; a solid fuel cell power generator coupled to the rechargeable battery; and a fuel cartridge for the solid fuel cell power generator. The fuel cartridge may be removeably coupled to the solid fuel cell power generator. The rechargeable battery, the solid fuel cell power generator, and the cartridge are housed in a form factor conforming to a size and shape of a standard battery.

In one embodiment, the rechargeable battery, the solid fuel cell power generator, and the fuel cartridge are housed in a form factor conforming to a size and shape of an LI-145 battery.

In one embodiment, the solid fuel cell power generator includes a power generation chip. In one embodiment, the power generator chip is mounted in a water-tight enclosure.

In one embodiment, the system further includes a heat sink having manifolding to supply fuel and air to the solid fuel cell power generator and to remove exhaust from the solid fuel cell power generator. In one embodiment, the system further includes a fan in communication with the heat sink to form a forced-air heat exchanger.

In one embodiment, the fuel cartridge is hot-swappable for another fuel cartridge. In one embodiment, the fuel cartridge includes a self-contained air supply.

In one embodiment, a power output of the system is integrally included in the battery.
the fuel cartridge includes a self-contained air supply.

In one embodiment, the system further includes an air intake device to draw in ambient air for a power generation reaction in the solid fuel cell power generator.

In accordance with another aspect of the concepts, systems, circuits, and techniques described herein, a wearable power system includes: means for storing energy having an input for charging the means for storing energy and an output for providing electric power; means for generating electric power from fuel, the means for generating being coupled to the means for storing energy to recharge the means for storing energy; and means for storing fuel for the means for generating electric power, the means for storing fuel being communicatively coupled to the means for generating electric power to supply fuel thereto, wherein the wearable power system conforms to a form factor of a standard battery.

In one embodiment, the wearable power system conforms to a size and shape of an LI-145 battery.

In one embodiment, the means for generating electric power includes a power generation chip. In one embodiment, the power generator chip is mounted in a water-tight enclosure.

In one embodiment, the wearable power system further includes a heat sink having manifolding to supply fuel and air to the means for generating electric power and to remove exhaust from the means for generating electric power. In one embodiment, the wearable power system further includes a fan in communication with the heat sink to form a forced-air heat exchanger.

In one embodiment, the means for storing fuel is hot-swappable. In one embodiment, the means for storing fuel includes a self-contained air supply.

In one embodiment, the wearable power system further includes means for drawing in ambient air for use in a power generation reaction in the means for generating electric power.

In accordance with a further aspect of the concepts, systems, circuits, and techniques described herein, a method for using a wearable power device that includes a battery, a solid fuel cell power generator to charge the battery, and a fuel cartridge to supply fuel to the solid fuel cell power generator includes determining whether the battery is adequately charged to power equipment; charging the battery with the solid fuel cell power generator if the battery is not adequately charged; powering equipment external to the wearable power device using the wearable power device; and further charging the battery as appropriate during or after powering the equipment.

In one embodiment, the charging of the battery and the powering of the equipment are performed concurrently.

In one embodiment, the fuel cartridge includes a self-contained air supply.

BRIEF DESCRIPTION OF THE DRAWINGS

The foregoing features of this invention, as well as the invention itself, may be more fully understood from the following description of the drawings in which.

DETAILED DESCRIPTION

Figure 1:
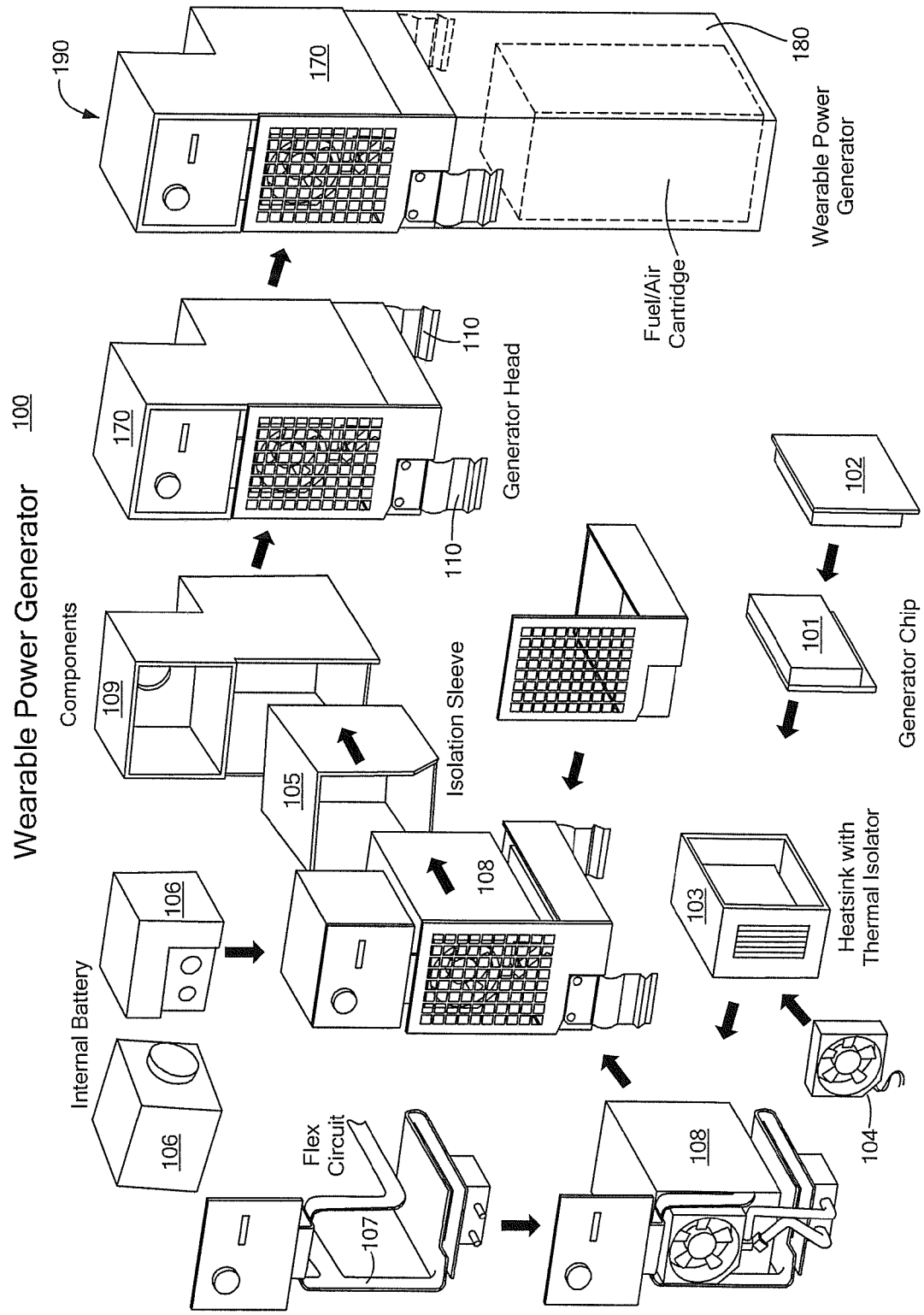
FIG. 1 is a diagram illustrating an exemplary manufacturing process for a wearable power generator according to an embodiment.

The present disclosure describes systems and methods to provide wearable power generators. Many of the examples below refer to modules in a military application. However, it is understood that embodiments may be adapted to any kind of module for consumer, commercial, and/or military use. Furthermore, while some embodiments conform to a form factor for a LI-145 battery, the scope of embodiments can include a wearable power generator conforming to any practical form factor.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include a wearable power generator that utilizes solid oxide fuel cell technology. One example of a suitable fuel is a butane/propane mix that is subjected to a non-combustion reaction to produce electricity, heat, and water. In another example, other hydrocarbon fuels can be used, such as gasoline if a reformer is used to clean sulfur and other contaminants from the fuel. The electricity from the fuel cell charges a battery, and the energy is accessed at the battery's outputs. Solid oxide fuel cell technology is a known technology that can be implemented as shown in 101a/101b indicated as Generator Chip in FIG. 2.

Concerns associated with a wearable power generation system include power density, size, shape, weight, and ease-of-use. One technical challenge includes compacting the components for a power generation device into a size that allows wearability as well as electrically connecting these components. A characteristic of some wearable devices is that they are under about two inches in thickness. Another technical challenge is that a power generation device could run at high temperatures, and that elevated temperature should be shielded from the user. For a wearable device in a military application, it is expected that the device can be operated in dirty environments and also be submerged underwater. Power generation devices have some level of efficiency, and the excess heat generated should be moved away from the power generation device.

FIG. 1 is an illustration of exemplary manufacturing process 100 for a wearable power generator 190, adapted according to one embodiment. This embodiment has a generator chip 101 mounted in a water-tight enclosure 102 that enables the generator chip 101 to move under thermal expansion but maintain thermal contact with the thermal isolator/heat sink 103, the triple O-ring (FIG. 2), and a spring-loaded connector (not shown) that holds enclosure 102 within thermal isolator/heat sink 103.

The thermal isolator adds a predictable thermal delta between chip 101 and the heat sink. The heat sink has internal manifolding for supplying fuel and air to chip 101. Generator 190 also includes fan 104 that pulls air through the thermal isolator/heat sink 103 until submerged, then shuts down due to overload, or switches off with a submergence detector, when submerged. During submersion, thermal isolator/heat sink 103 is cooled by the water. Fan 104 restarts when un-submerged to return to pulling air through thermal isolator/heat sink 103. Additionally, this example embodiment includes isolation sleeve 105 that attenuates the shock and vibration from the environment to chip 101 and also provides thermal insulation to ensure that the outside of the generator 190 is kept within touch temperature limits.

Generator 190 also includes internal battery 106 that has the input/output power interface (not shown) to the generator 190. The input/output in this example is integral to battery 106.

Power is transferred from chip 101 to battery 106 by flex circuit 107 (e.g., a flexible printed circuit board). Flex circuit 107 incorporates rigid-flex technology, connectors with spring-loaded pins, an embedded membrane button, embedded LEDs, and control circuitry. Flex circuit 107 passes through or under cover 108 with a water-tight seal incorporated around the flex circuit 107.

Generator 190 includes two main portions. Generator head 170 includes the components described above such as chip 101, fan 104, and the like, housed within frame 109. Generator 190 also includes fuel/air cartridge 180, which supplies fuel and oxidizing air for the reactions in chip 101. In this embodiment, a fuel/air cartridge may be replaced with another fuel/air cartridge when empty. To this end, the embodiment of FIG. 1 utilizes spring clips 110 to allow quick removal and replacement of the fuel/air cartridge 180.

Figure 3:
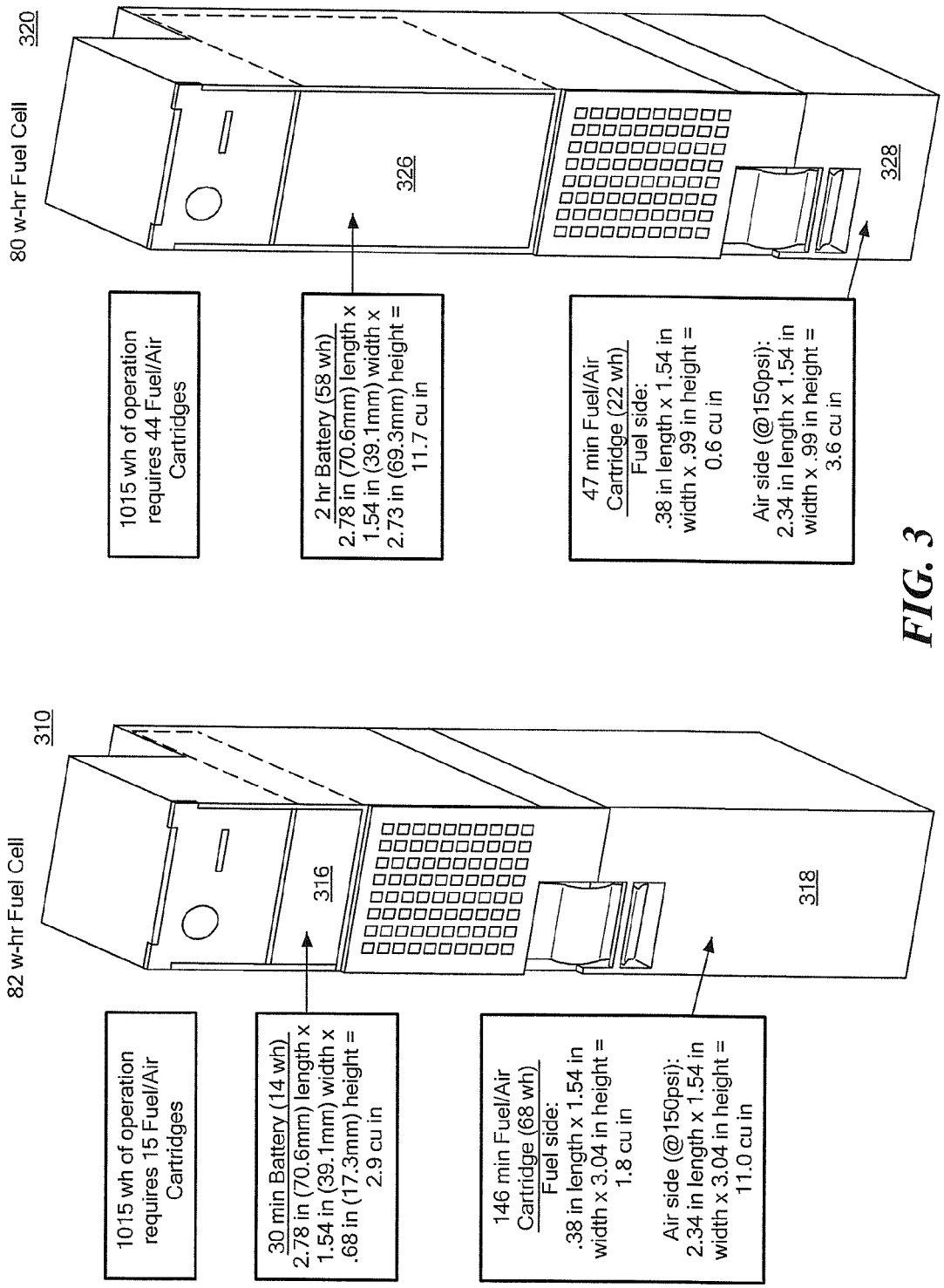
FIG. 3 is a diagram illustrating two different embodiments of a wearable power generator showing a tradeoff between battery size and fuel/air cartridge size.
Figure 4:
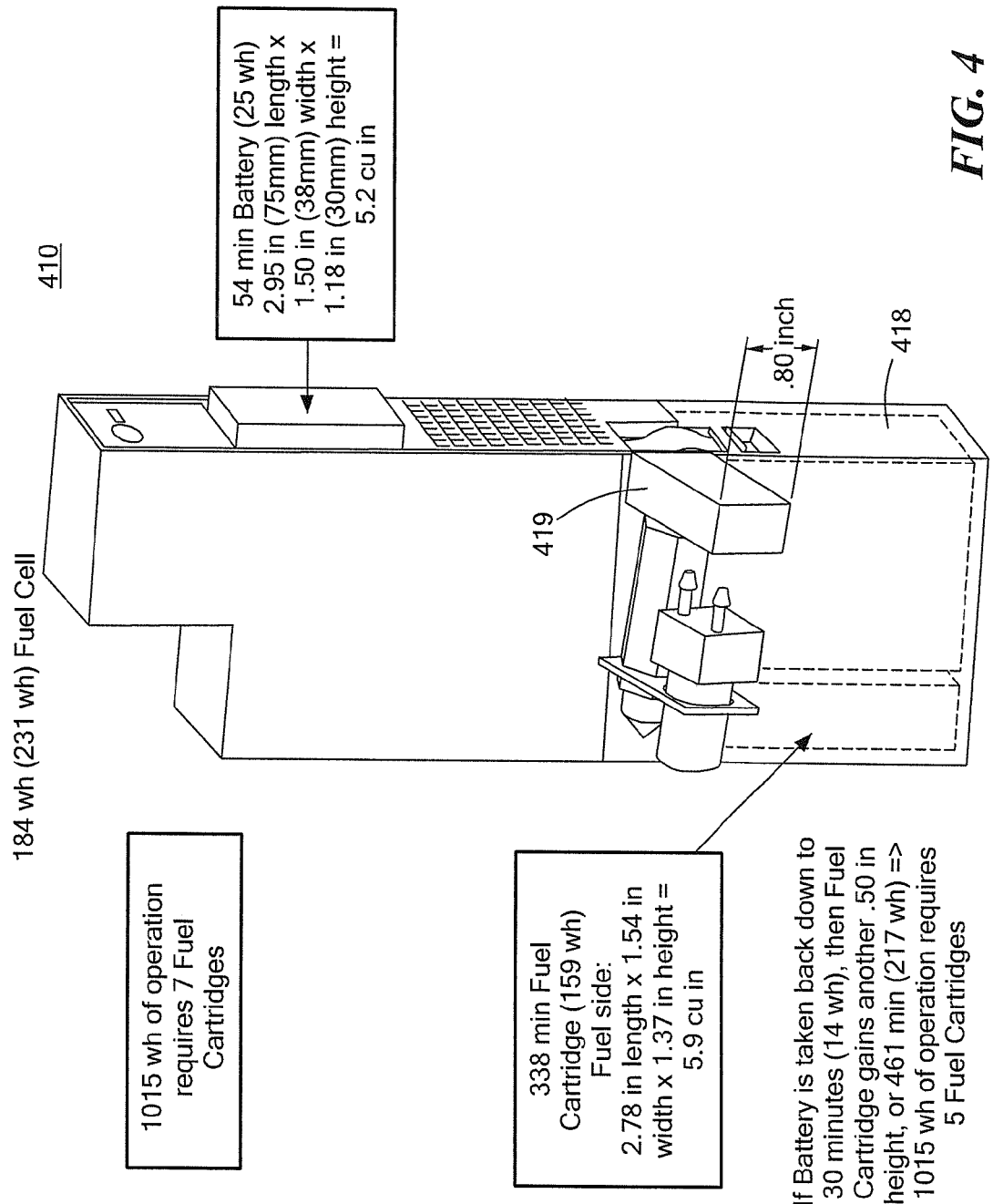
FIG. 4 is an illustration of exemplary power generation device adapted according to an embodiment that does not include a self-contained air supply.

FIG. 1 illustrates a method of manufacture, where the various components are assembled into assemblies and housings to produce generator 190. Other embodiments with additional steps, fewer steps, or differently-ordered steps are possible in other embodiments. Furthermore, the embodiments of FIGS. 3 and 4 show generators with different configurations for placement and size of battery 106, and functionality and size of cartridge 180. It is understood that the embodiments of FIGS. 3 and 4 may be assembled using the principles illustrated in FIG. 1.

Figure 2:
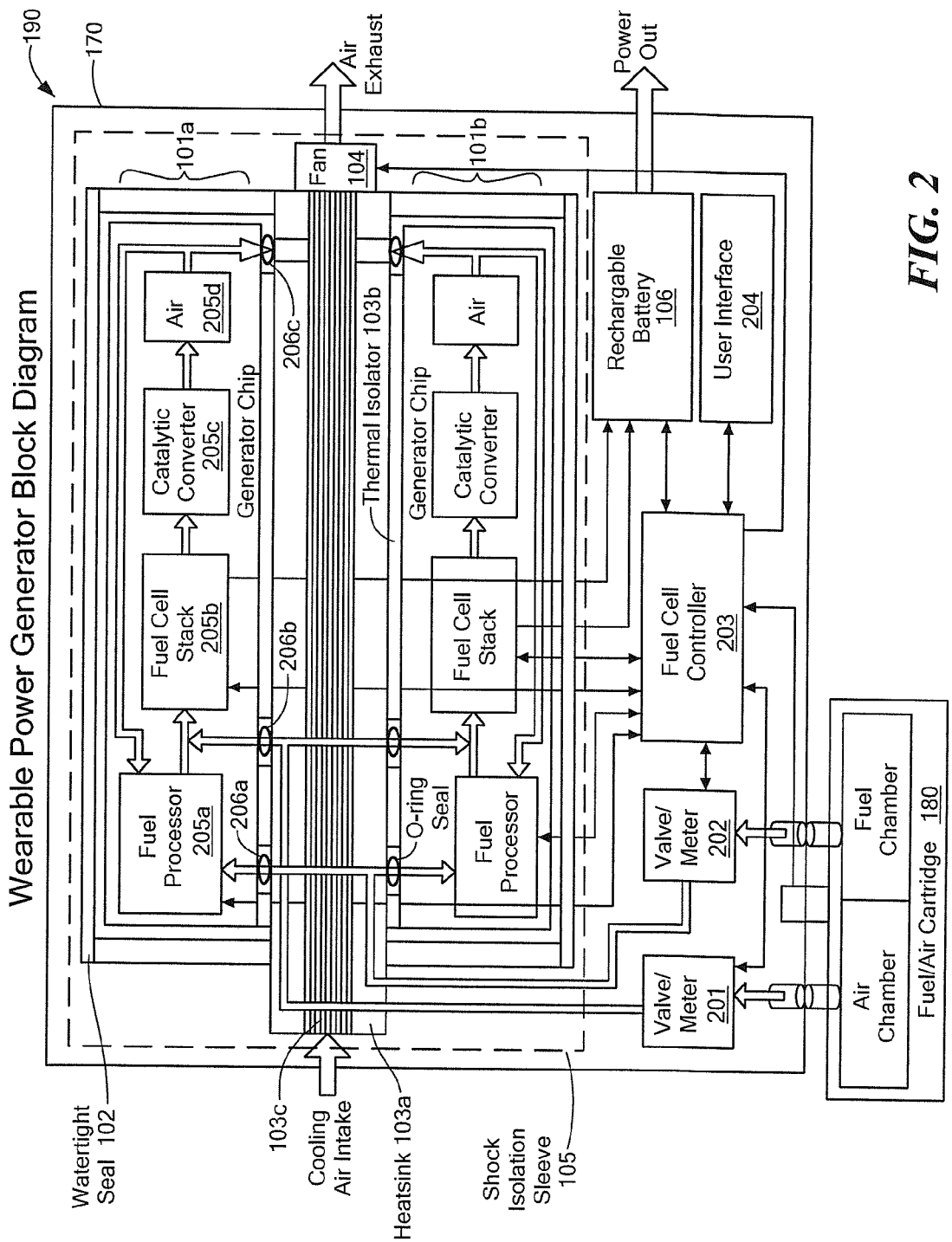
FIG. 2 is a block diagram illustrating functionality within a generator head of a wearable power generator according to an embodiment.

FIG. 2 is a schematic block diagram of generator 190, according to one embodiment. FIG. 2 shows the internal components and arrangement of generator head 170 in detail.

Generator head 170 includes thermal isolator/heat sink 103, which is shown as heat sink 103a, thermal isolator 103b, and manifolding 103c. Fan 104 draws cooling air through heat sink 103a and outputs the air exhaust, which is a mixture of water and air. Fan 104 and heat sink 103a form a miniature forced-air heat exchanger.

Fuel cell controller 203 is a processor-based device that controls the operations of the various components of generator 190. Examples of processors for processor-based devices include, e.g., microcontrollers, Application Specific Integrated Circuits (ASICs), Field Programmable Gate Arrays (FPGAs), general-purpose processors, and the like. Valve/meter devices 201 and 202 are controlled by controller 203 to provide an appropriate mixture and amount of fuel/air to chip 101 to ensure appropriate battery charging. Fuel cell controller 203 also manages the internal workings of chip 101. User interface 204 provides a visual indication to the user of how much charge is stored in battery 106 and how much fuel is left in cartridge 180.

Chip 101 has up to this point been described as a unitary chip, but in this embodiment, chip 101 includes two solid fuel cell chips 101a and 101b arranged symmetrically about heat sink 103a. Various embodiments may include one, two, or more solid fuel cell chips, as appropriate for a given application. In this example, solid fuel cell chips 101a, 101b are each about the size of a matchbox.

Each of the solid fuel cell chips 101a, 101b are similar or identical, so only chip 101a is described. It is understood that chip 101b has a similar structure and operation.

Solid fuel cell chip 101a includes fuel processor 205a, which converts hydrocarbon fuel into hydrogen and carbon monoxide and these atoms are then sent to fuel cell stack 205b. Fuel cell stack 205b is a catalyst that extracts the fuel atoms of electrons while the missing electrons are replaced with air (atmospheric oxygen) through an electrolyte membrane. The flow of electrons generates currents and the gaseous byproducts through catalytic converter 205c are water and CO2, exhausted to manifolding 103c. The exhaust air and water is sent to air chamber 205d and the hot air is re-circulated to fuel processor 205a in order to increase the overall fuel cell efficiency before being exhausted into manifolding 103c.

Solid fuel cell chip 101a also includes O-rings 206a-c. The triple O-ring design seals the three passageways independently from each other, even under heat and pressure.

The scope of embodiments is not limited by the particular inner workings of chip 100. Other embodiments may employ different solid fuel cells as appropriate.

In the embodiment shown in FIG. 1, there is a trade-off between the size of fuel/air cartridge 180 versus the size of battery 106. A bigger battery provides a longer life between battery recharges. However, a bigger battery typically means a smaller cartridge 180, assuming the same form factor. FIG. 3 is an illustration of two different embodiments showing the tradeoff between battery size and fuel/air cartridge size.

The embodiment 310 and the embodiment 320 both have a LI-145 form factor, but embodiment 310 has a smaller battery 316 than does embodiment 320. The smaller battery 316 allows embodiment 310 to have a larger fuel/air cartridge 318. Battery 316 lasts thirty minutes at maximum load, whereas battery 326 lasts two hours at maximum load. Fuel/air cartridge 318 provides 146 minutes of operation, whereas fuel/air cartridge 328 provides forty-seven minutes of operation.

The data comparison in FIG. 3 shows that embodiment 310 would use fifteen fuel/air cartridges 318 to provide 1015 Wh of energy. Embodiment 320 would use forty-four fuel/air cartridges 328 to provide the same 1015 Wh. While longer battery life is typically more desirable than shorter battery life, it must be balanced against the ability of a soldier to carry additional fuel/air cartridges to facilitate the longer battery life. Any embodiment may be designed for a given application according to the needs of the given application. Embodiments 310 and 320 are merely examples, and the scope of embodiments is not limited to the particular battery sizes and fuel/air cartridge sizes shown.

FIG. 4 is an illustration of exemplary power generation device 410 adapted according to one embodiment. Power generation device 410 has a fuel cartridge 418 that does not include a self-contained air supply. Rather, fuel cartridge 418 has air intake device 419 that draws in ambient air and supplies the air to the generator chip (not shown). An advantage of power generation device 410 is that, for a given battery size, it uses fewer fuel cartridges 418 to produce the same amount of energy, since it eliminates space occupied by a self-contained air supply. A disadvantage of power generation device 410 is that it typically does not operate while submerged so as to avoid taking in water. Thus, power generation device 410 includes a water sensor to facilitate a stop function when the device is in water. Power generation device 410 also includes an air filter (not shown) and hydrophobic membrane (not shown) within air intake device 419 to remove water and debris during operation.

In the embodiment of FIG. 4, there is a trade-off between battery size and fuel cartridge size, as in FIG. 3. Example size and capacity parameters are shown in FIG. 4. The scope of embodiments is not limited to the particular battery sizes and fuel cartridge sizes shown.

Figure 5:
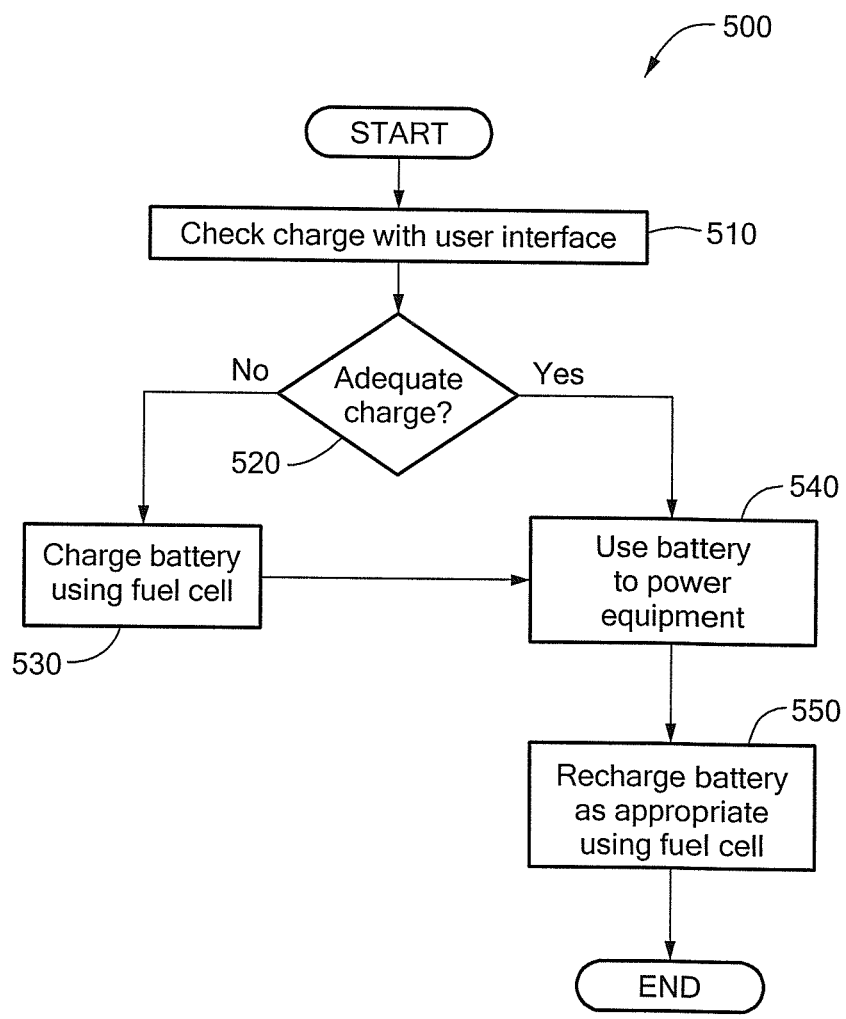
FIG. 5 is a flowchart illustrating an exemplary method for using a wearable power generation device according to an embodiment.

FIG. 5 is an illustration of exemplary method 500 for using a wearable power generation device according to one embodiment. In one example, method 500 is performed while a soldier or other user provides power for an application using an embodiment from FIGS. 2-4. In some embodiments, the actions of blocks 520-550 are performed automatically by the fuel cell controller 203 (FIG. 2).

In block 510, the user checks the charge with the user interface. In this example, the user interface provides an indication of the amount of charge left in the battery of the device. It also provides an indication of the amount of fuel left in the fuel cartridge, or fuel/air in the fuel/air cartridge. The user can look at the user interface and discern whether the battery should be charged, or the fuel or fuel/air cartridge should be replaced.

In block 520, it is discerned whether the battery has adequate charge to begin powering equipment. If the battery does not have adequate charge, the battery is charged using the fuel cell generator function at block 530. If the battery does have adequate charge, then the battery is used to power equipment at 540. Furthermore, the battery may be used to power equipment at block 540 while it is charging with the fuel cell generator function. In some instances, the lithium type chemistry batteries cannot be used while being charged. However, it is possible to modify battery 106 (FIG. 1) so that it can be used while it is being charged in some embodiments, even if it is a lithium chemistry battery. One example solution includes using an ultra-capacitor to retain charge which can be used while the battery is being charged. Another example includes using two rechargeable batteries in the system (i.e., dividing the battery into two compartments) wherein one battery is charging while the other battery is supplying power to systems, and then switching the roles of the two batteries as appropriate.

In block 550, the battery is recharged as appropriate using the fuel cell generator function. In one example, fuel/air cartridges or fuel cartridges are replaced as they become spent while the device powers equipment. In another example, fuel/air cartridges or fuel cartridges are used to fully charge the battery regardless of whether the battery is still powering a load. Block 550 may include the actions of blocks 510, 520, 530.

Various embodiments may include advantages over other techniques. In one aspect, some embodiments provide a lightweight and compact source of energy for powering equipment in the field for military, industrial, and consumer use. In another aspect, the power generation devices of the examples above can provide an amount of energy limited only by the number of fuel/air cartridges or fuel cartridges that are available. Furthermore, the fuel and fuel/air cartridges may be hotswappable so that power is not lost when cartridges are changed.

In another aspect, embodiments can be designed to have the same size, shape, weight, and ease-of-use as a standard battery, such as an LI-145 battery. The energy density is also greater than in standard batteries.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system comprising:
a rechargeable battery;
a solid fuel cell power generator coupled to the rechargeable battery, the power generator having a sensor to disable an air intake of the power generator when the system is submerged; and
a fuel cartridge for the solid fuel cell power generator, the fuel cartridge being removably coupled to the solid fuel cell power generator;
wherein the rechargeable battery, the solid fuel cell power generator, and the cartridge are housed in a form factor conforming to a size and shape of a standard battery.

2. The system of claim 1, wherein:
the rechargeable battery, the solid fuel cell power generator, and the fuel cartridge are housed in a form factor conforming to a size and shape of an LI-145 battery.

3. The system of claim 1, wherein:
the solid fuel cell power generator includes a power generation chip.

4. The system of claim 3, wherein:
the power generator chip is mounted in a water-tight enclosure.

5. The system of claim 3, further comprising:
a heat sink having manifolding to supply fuel and air to the solid fuel cell power generator and to remove exhaust from the solid fuel cell power generator.

6. The system of claim 5, further comprising:
a fan in communication with the heat sink to form a forced-air heat exchanger.

7. The system of claim 1, wherein:
the fuel cartridge is hot-swappable for another fuel cartridge.

8. The system of claim 1, wherein:
a power output of the system is integrally included in the battery.

9. The system of claim 1, wherein:
the fuel cartridge includes a self-contained air supply.

10. The system of claim 1, further comprising:
an air intake device to draw in ambient air for a power generation reaction in the solid fuel cell power generator.

11. A wearable power system comprising:
means for storing energy having an input for charging the means for storing energy and an output for providing electric power;
means for generating electric power from fuel, the means for generating being coupled to the means for storing energy to recharge the means for storing energy;
means for sensing whether the wearable power system is submerged;
means for drawing in ambient air for use in a power generation reaction in the means for generating electric power when the wearable power system is not submerged;
means for disabling drawing in ambient air when the wearable power system is submerged; and
means for storing fuel for the means for generating electric power, the means for storing fuel being communicatively coupled to the means for generating electric power to supply fuel thereto, wherein the wearable power system conforms to a form factor of a standard battery.

12. The wearable power system of claim 11, wherein:
the wearable power system conforms to a size and shape of an LI-145 battery.

13. The wearable power system of claim 11, wherein:
the means for generating electric power includes a power generation chip.

14. The wearable power system of claim 13, wherein:
the power generator chip is mounted in a water-tight enclosure.

15. The wearable power system of claim 11, further comprising:
a heat sink having manifolding to supply fuel and air to the means for generating electric power and to remove exhaust from the means for generating electric power.

16. The wearable power system of claim 15, further comprising:
a fan in communication with the heat sink to form a forced-air heat exchanger.

17. The wearable power system of claim 11, wherein:
the means for storing fuel is hot-swappable.

18. The wearable power system of claim 11, wherein:
the means for storing fuel includes a self-contained air supply.

19. A method for using a wearable power device, the wearable power device including a battery, a solid fuel cell power generator to charge the battery, and a fuel cartridge to supply fuel to the solid fuel cell power generator that are all housed in a form factor conforming to a size and shape of a standard battery, the method comprising:
determining whether the battery is adequately charged to power equipment;
determining whether the wearable power device is submerged and, if not:
charging the battery with the solid fuel cell power generator if the battery is not adequately charged;
powering equipment external to the wearable power device using the wearable power device; and further charging the battery as appropriate during or after powering the equipment;

otherwise, if the wearable power device is submerged:
  disabling operation of the solid fuel cell power generator.

20. The method of claim 19, wherein:
charging and powering are performed concurrently.

21. The method of claim 19, wherein:
the fuel cartridge includes a self-contained air supply.

* * * * *